United States Patent [19]

Lapine et al.

[11] 4,337,976
[45] Jul. 6, 1982

[54] REAR OF AN AUTOMOBILE, PREFERABLY A PASSENGER CAR

[75] Inventors: Anatole Lapine, Doeffingen; Reinhold Schreiber, Renningen, both of Fed. Rep. of Germany

[73] Assignee: Dr. Ing. h.c.F. Porsche Aktiengesellschaft, Stuttgart, Fed. Rep. of Germany

[21] Appl. No.: 116,208

[22] Filed: Jan. 28, 1980

[30] Foreign Application Priority Data

Jan. 27, 1979 [DE] Fed. Rep. of Germany ....... 2903161

[51] Int. Cl.³ .................................. B60J 7/00
[52] U.S. Cl. .................. 296/216; 296/37.16; 296/195
[58] Field of Search ............... 296/37.16, 183, 215, 296/216, 100, 76, 195

[56] References Cited

U.S. PATENT DOCUMENTS

| | | | |
|---|---|---|---|
| D. 205,132 | 6/1966 | Porsche, Jr. | 296/216 X |
| 3,110,429 | 11/1963 | Philips | 296/37.16 X |
| 3,290,086 | 12/1966 | Petrak | 296/63 |
| 3,413,031 | 11/1968 | Gafrert et al. | 296/63 |
| 3,465,770 | 3/1969 | Volsk | 296/37.16 X |
| 3,781,059 | 12/1973 | Davis | 296/100 X |
| 3,820,839 | 6/1974 | Molatalab | 296/216 X |
| 3,823,977 | 7/1974 | Fioravanti | 296/216 X |
| 4,127,301 | 11/1978 | Syrowik | 296/37.16 |
| 4,168,859 | 9/1979 | Breitschweret et al. | 296/216 X |

Primary Examiner—Joseph F. Peters, Jr.
Assistant Examiner—John A. Carroll
Attorney, Agent, or Firm—Craig and Antonelli

[57] ABSTRACT

A rear body construction for an automobile vehicle of the type having a door opening at the rear of the vehicle body, has a body element that closes the door opening by way of horizontal and upright walls that form a receptacle that has a topside open toward the exterior of the vehicle. According to a preferred embodiment, the receptacle has the configuration of a trough (such as found on pick-up trucks) and is constructed so as to be utilized interchangeably with a trunk door (such as a windowed fast-back type hatch) for the purpose of closing the door opening at the rear of the vehicle, the receptacle itself having an upright section that includes a window pane which forms the rear window of the vehicle, even vehicles having front and rear seats.

16 Claims, 6 Drawing Figures

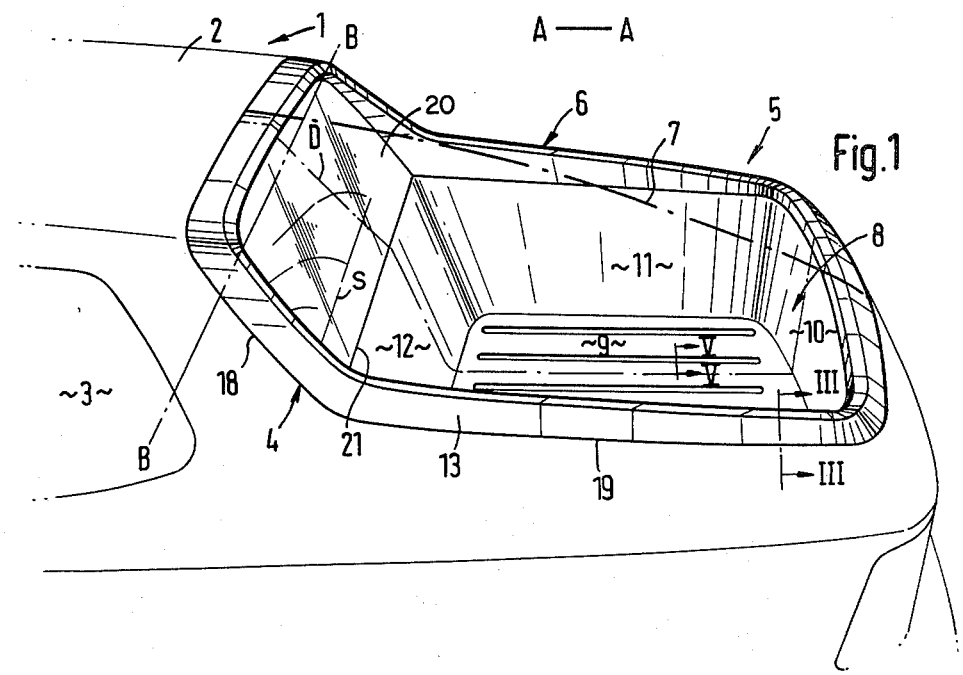
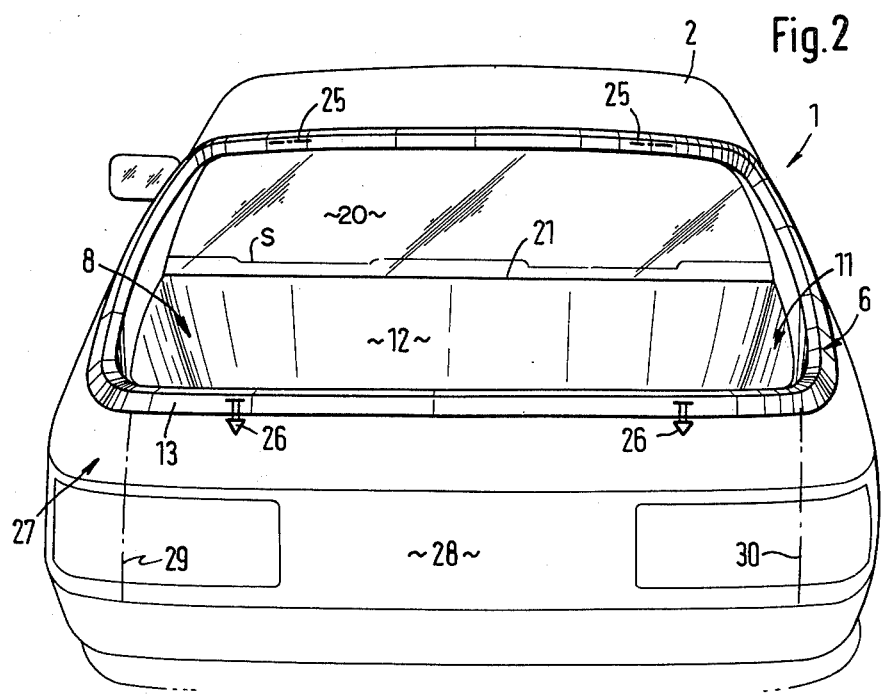

REAR OF AN AUTOMOBILE, PREFERABLY A PASSENGER CAR

BACKGROUND AND SUMMARY OF THE INVENTION

The invention relates to the rear of an automobile, preferably a passenger car, that has a body element which closes an opening in the car body.

In a known vehicle of the type in question, the body element is constituted by a hingedly articulated door that has no provision for the reception of objects.

It is also known (*Car Styling*, no. 21/1978, pp 81–87) that the rear of a passenger car can be provided with a loading surface. This loading surface extends over the area of the conventional rear seat, whereby passengers in the back in the passenger compartment have no room.

The invention thus has as an object to produce a vehicle, advantageously a passenger car, whose utility is increased by a cargo space in the rear, without any essential limitation of space in the passenger compartment.

This object is achieved according to a preferred embodiment of the invention, in that the body element presents a receptacle that is constituted by horizontal and upright walls of the body element. For this it is advantageous if the receptacle has the configuration of a trough. The walls at least in sections are connected to a frame that defines the opening. The frame is formed peripherally as a somewhat U-shaped profile. The receptacle is made as one piece with the body element. The receptacle at least in sections is formed by a separate part. Insofar as the opening, seen from the side, has a stepped outline, it is an advantage if the body element has a pane in the region of the upright section of the opening. The pane and the wall of the receptacle connected thereto have approximately the same length. Seen in the direction of travel, the pane has a greater angle of inclination than that of the wall to which it is joined. The horizontal wall of the receptacle that forms the floor presents supporting elements. These supports are constituted by ridges. There is also the possibility that the supporting elements may be made as wooden, plastic, etc. parts set in on the floor. In consideration of weight, the body element can be made of plastic. In addition, the body element can be exchanged for a trunk door, whereby on the body element there is provision of fittings corresponding to the door, e.g. hinges, latches or the like.

Principal advantages that are produced by the invention reside in that the body element that can be set in instead of a trunk door and has a receptacle which serves to hold equipment for sports, recreation or the like. The receptacle is constituted simply, by walls of the body element. With this arrangement of the frame as well as the association of the receptacle thereto, even relatively heavy objects can be well transported. The arrangement of the pane is such that essentially it cannot be damaged by objects. Moreover, there is the possibility that a trunk door can replace the body element, whereby with one single basic structure of a passenger car, it is possible to have two models of the vehicle.

These and other objects, features and advantages of the present invention will become more apparent from the following description when taken in connection with the accompanying drawings, which show, for purposes of illustration only, plural embodiments in accordance with the present invention.

BRIEF DESCRIPTION OF THE DRAWINGS

FIG. 1 shows an oblique view from above, of a passenger car with the rear area according to the invention;

FIG. 2 shows a rear view of the passenger car of FIG. 1;

DETAILED DESCRIPTION OF THE PREFERRED EMBODIMENT

Figure 3:
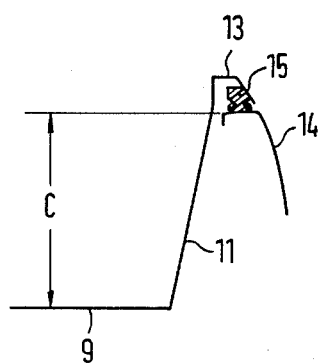
FIG. 3 is a section along line III—III of FIG. 1.

Passenger car 1 has a body 2 with a passenger compartment 3. The passenger compartment 3 has two seats, one behind the other when seen in the long direction A—A of the car, these seats being merely indicated schematically in big broken lines.

Behind the rear seat emplacements, with the upper edge of the back seat extending about in plane B—B, body 2 presents an opening 4 that defines a part of the rear region 5 and is closed by means of a body element 6.

Body element 6 which is set in opening 4 instead of a trunk door, such as a windowed fastback type hatch represented by contour line 7, has a receptacle 8 to receive objects, e.g. sport and recreation equipment. Receptacle 8 is formed by a horizontal wall 9 and upright walls 10, 11, 12. These walls are disposed with respect to each other in such a way that receptacle 8 has a troughlike configuration.

Walls 10, 11, 12 are connected to a frame 13 that runs along the perimeter of opening 4. Frame 13 peripherally has more or less the shape of an inverted U whose cross-sectional dimensioning and configuring is essentially determined by the form of the car body. A packing 15 is provided between body wall 14 and frame 13.

Figure 4:
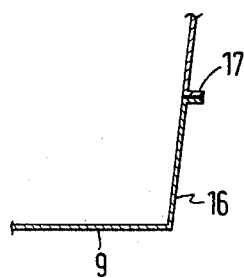
FIG. 4 is a view according to FIG. 3.

Receptacle 8 penetrates into body 2 by the amount C, and is made in one piece with body element 6. However, there is also the possibility that a part 16 (FIG. 4) of receptacle 8 could be prefabricated and connected to body element 6 by a suitable process, at 17.

The opening 4 has a stepped outline when seen from the side (an upright section 18 extends between the roof and section 19 which run about horizontally). In the region of the upright section 18, the body element 6 has a clear pane 20. Pane 20 is connected to wall 12 at 21, whereby pane 20 and wall 12 are about of the same length. Also, pane 20 has a somewhat greater angle of inclination than wall 12 in a direction toward the front of the vehicle.

Figure 5:
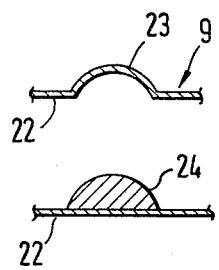
FIG. 5 is a section along line V—V of FIG. 1, on a larger scale.
Figure 6:
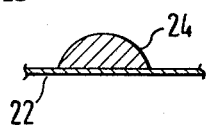
FIG. 6 is a view according to FIG. 5.

On floor 22 that is formed by wall 9, there are localized supporting elements that either are constituted by ridges 23 worked into wall 9 (FIG. 5), or by separate parts 24 made of wood, plastic or the like that are fixed to floor 22 (FIG. 6).

Body element 6, as already noted, can be exchanged for a trunk door, and this is facilitated by positioning the fittings of body element 6 so as to correspond to those on the door so that the same hinge and latch components, 25, 26, on the body 2 can be used for securement of body element 6 and trunk door 7.

To the extent that body element 6 is to serve as a door, the back wall 27 of body 2 can be provided with a member 28 that can be folded down or taken out, whereby parting lines are indicated by numerals 29 and 30.

Provision can also be made so that the receptacle 8 can be covered by a tarpaulin, at the level of the upper edge of frame 13 by provided conventional retaining members attached thereto.

While we have shown and described only plural embodiments in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

What is claimed is:

1. Rear body construction of an automobile vehicle of the type having a rearwardly directed door opening at the rear end of the vehicle body that, as seen from a side of the vehicle, forms a stepped outline with a roof portion of the vehicle body, comprising a body element that closes the door opening in the body, said body element including: a horizontal wall and upright walls which define a generally trough-shaped receptacle which has a top side that is open toward the exterior of the vehicle body; a frame, connected to said upright walls at least in sections, that conforms substantially to the entire perimeter of the door opening for mating therewith; an upright section in the vicinity of the roof portion; and a window pane in the region of the upright section.

2. Rear body construction as in claim 1, characterized in that the frame peripherally has the shape of an inverted U for overlying said perimeter of said door opening.

3. Rear body construction as in claims 1 or 2, characterized in that the receptacle is an integral part of the body element.

4. Rear body construction as in claim 1, characterized in that at least a section of the receptacle is constituted by a part that is separate from the remainder of the body element.

5. Rear body construction as in claim 1, characterized in that the window pane is connected to a wall of the receptacle, the window pane and the wall connected thereto being of approximately the same length.

6. Rear body construction as in claim 5, characterized in that the window pane has a greater angle of inclination toward the front of the vehicle than that of the wall which is connected thereto.

7. Rear body construction as in claim 1, characterized in that the horizontal wall of the receptacle forms a floor and has support elements thereon.

8. Rear body construction as in claim 7, characterized in that the support elements are constituted by ridges.

9. Rear body construction as in claim 7, characterized in that the support elements are constituted by parts attached to the floor, said parts being made of wood, plastic or the like.

10. Rear body construction as in one of claims 1 or 7, characterized in that the body element is made of plastic.

11. Rear body construction as in claim 1, characterized in that the door opening is exchangeably closeable by said body element or a trunk door, the body element and the trunk door being provided with correspondingly positioned fittings for joining to fittings mounted to the vehicle body in the vicinity of the door opening.

12. Rear body construction according to claim 11, wherein said door opening is located substantially behind a rear seat of the vehicle.

13. Rear body construction as in claim 11, wherein the trunk door is a windowed fast-back type hatch, said fittings comprising hinge members in the vicinity of the vehicle roof and a latching arrangement in the vicinity of a lower rearmost area of the door opening.

14. Rear body construction according to claim 13, wherein said door opening is located substantially behind a rear seat of the vehicle.

15. Rear body construction as in claim 11, wherein the trunk door is a windowed fast-back type hatch, said fittings comprising hinge members in the vicinity of the vehicle roof and a latching arrangement in the vicinity of a lower rearmost area of the door opening.

16. Rear body construction according to claim 11, wherein a rear wall of a portion of the vehicle body defining said door opening is provided with a panel that can be folded down or removed.

* * * * *